United States Patent [19]
Wheat et al.

[11] Patent Number: 5,182,163
[45] Date of Patent: Jan. 26, 1993

[54] FLAME RETARDANT FOAM MATERIAL

[75] Inventors: James A. Wheat, Ottawa; Rolland P. Fuoco, Hull; J. Kimberley Dix, Ottawa, all of Canada

[73] Assignee: Minister of National Defence of Her Majesty's Canadian Government, Ottawa, Canada

[21] Appl. No.: 787,876

[22] Filed: Nov. 5, 1991

[30] Foreign Application Priority Data

Dec. 24, 1990 [CA] Canada ................................ 2033114

[51] Int. Cl.$^5$ ............................................. B32B 7/00
[52] U.S. Cl. .................................... 428/224; 428/254; 428/257; 428/283; 428/304.4; 428/316.6; 428/317.9
[58] Field of Search ................. 428/317.9, 323, 253, 428/254, 283, 224, 257, 304.4, 316.6

[56] References Cited

U.S. PATENT DOCUMENTS

| | | | |
|---|---|---|---|
| 2,984,584 | 5/1961 | Glarum et al. | 428/244 |
| 3,238,056 | 3/1966 | Pall et al. | 428/388 |
| 4,045,609 | 8/1977 | Hart | 428/317.9 |
| 4,046,939 | 9/1977 | Hart | 55/74 |
| 4,153,745 | 5/1979 | Hart | 428/317.9 |
| 4,190,696 | 2/1980 | Hart et al. | 428/323 |

FOREIGN PATENT DOCUMENTS 575379 2/1946 United Kingdom.

*Primary Examiner*—William J. Van Balen
*Attorney, Agent, or Firm*—Nixon & Vanderhye

[57] ABSTRACT

A fire-retardant air and water vapor permeable foam material resistant to passage therethrough of noxious chemicals in liquid or vapor form is described. The foam material is typically an open-cell polyurethane foam including a particulate adsorbent, organic binder and a solid water-insoluble fire-retardant dispersed in the foam. The foam material is bonded on at least one side to an air and water vapor permeable fabric to form a fire-retardant laminate material suitable for the manufacture of various protective garments.

19 Claims, No Drawings

FLAME RETARDANT FOAM MATERIAL

BACKGROUND OF THE INVENTION

This invention relates to cellular resin foam materials which are resistant to the passage of noxious undesirable chemicals in the form of liquids, condensible vapour and gases, but which are relatively permeable to air and water vapour. More particularly, the invention relates to the fire-proofing of such materials.

For protection against noxious chemicals such as the gases and smokes employed in chemical warfare, and also against dangerous chemicals such as industrial poisons and pesticides which are generally in the form of sprays or mists, it is customary to use protective equipment and in particular protective clothing which incorporates a gas and vapour adsorbent material.

The prerequisites of an ideal gas-proofed material, in particular for use as wearing apparel, are as follows. The material should be such that it adsorbs a relatively large portion of noxious chemicals such as chemical warfare agents while retaining permeability to oxygen or air; the supporting material for the adsorbent should be substantially porous in order to permit perspiration or other liquids to evaporate from the wearer's body; the material comprising the support should substantially retain its flexibility after being combined with the gas adsorbent; and the gas adsorbent should be substantially permanently bound to the supporting material in order to prevent the adsorbent from becoming dislodged from the support by rain, laundering or rough usage or by the softening effect of moisture and perspiration. Finally the gas-proofed material should be capable of reuse after decontamination.

DESCRIPTION OF THE PRIOR ART

Garments have been provided which are made from fabric which is sufficiently permeable to air and water vapour to permit their use by humans with some degree of comfort for a reasonable period and at the same time provide protection from the undesirable effects of noxious chemicals such as chemical warfare agents. Such garments are described, for example, in British Patent 575,379 issued Feb. 15, 1946 to Kingan, and U.S. Pat. No. 2,984,584 issued May 16, 1961 to Glarum. In these patents woven and non-woven fabrics are impregnated with an adsorbent such as finely divided carbon which is held in place on the textile fibres by a polymeric binder.

In U.S. Pat No. 3,238,056 which issued Mar. 1, 1986 to D. B. Pall et al, disclosed is a filter element which has the purpose of physically removing particulate material from liquid and gaseous medium. The separation is effected purely on a physical basis and is determined by the size of the pores in the filter element. As it stated in Pall et al, comnventional filters of normal porosity have pores ranging up to $150\mu$ or more. The object of the invention of Pall et al is to incorporate into the pores of conventional filters, fibres or granules which are of a size small enough to enter the pores and to reduce the pores in size to less than $25\mu$ in diameter. Thus, Pall et al for its purpose is merely concerned with the physical presence of inter alia the particulate material in reducing the size of the pores and inherently in reducing the size of the pores it is an object of Pall et al to reduce the permeability of the filter element as much as possible to the passage of inter alia gases.

Further, in the disclosure of Pall et al, he states that the filter medium may be any porous material whose pores extend from surface to surface and in a long list of such materials, he specifies foamed polyurethane. Further, in referring to impregnated material used to reduce the size of the pores, Pall et al prefers fibrous material although he states that you can use particulate material and then goes into a long list of particulate materials that can be used and includes within his list diatomaceous earth, Fuller's earth and activated carbon. It is thus clear that all that is being used in the Pall et al invention is the physical presence of these materials rather than any coincident requirement of their activity as adsorbents.

Pall et al further state that the particulate material may be bonded into the pores of the substrate using an organic binder and proceed to give a list of organic binders which may be useful. Further, in the preparation of the foam, Pall et al state that a dispersing agent may be used to form a dispersion of the particulate material in the liquid. However, Pall et al gives no indication or inference that the organic binder must be substantially free from substances which substantially deactivate the adsorbent. It is emphasized that organic binders in general are polymeric materials as can be readily seen from the list given in column 6, lines 42 to 56 of Pall et al. These binders, particularly when obtained from chemical sources, may contain substances which deactivate the adsorbent material and in particular may contain substantial amounts of impurities, low molecular weight polymer processing additives and plasticizers which would deactivate the adsorbent material.

In U.S. Pat No. 4,046,939 of J. A. Hart, issued Sep. 6, 1977, an air and water vapour permeable open cell solid resin foam resistant to passage therethrough of noxious chemicals in liquid or vapour form, in which there is dispersed a particulate adsorbent material for said noxious chemicals, and laminated fabric materials, e.g. in the form of protective clothing, incorporating said foam, are described. The particulate adsorbent material is bonded in said foam by an organic binder which is substantially free from substances which would substantially deactivate the adsorbent. The laminated fabric materials described in this patent include an air and water vapour-permeable fabric backing to which the aforesaid foam is bonded.

Unfortunately these foam materials have the disadvantage that they can be ignited easily and will burn, leaving a glowing residue which is difficult to extinguish.

Many substances are known and have been used to induce flame resistance when added to flammable materials. Among the more effective organic substances containing nitrogen, halogen or phosphorus. However, all of these substances when applied to or incorporated in materials containing activated carbon are themselves adsorbed on the activated carbon. Further, many conventional flame retardant compositions contain auxiliary agents which ar also adsorbed by activated carbon such as emulsifying, dispersing and wetting agents. When adsorbed on the carbon they occupy active sites and thus reduce the capacity of the carbon for further adsorption and degrade its protective capability.

In applicant's U.S. Pat. No. 4,190,696 of Feb. 26, 1980, a fire-resistant charcoal-impregnated foam material is described. However, it has now been found that the water-soluble fire-retardant phosphates added to the foam material from aqueous solution tend to wash out upon exposure to rain, immersion in water, laundering and sweat. It will also be apparent from the Examples which follow that such phosphates are most effective as after glow suppressants, but permit some after flame. Moreover, their presence may reduce the activity of the charcoal.

SUMMARY OF THE INVENTION

According to the invention, a fire-retardant air and water vapour permeable foam resistant to passage therethrough of noxious chemicals in liquid or vapor form is provided, comprising an open-cell solid resin foam; a particulate adsorbent for said noxious chemicals dispersed in said foam; and organic binder for bounding said particulate in said foam; and a solid particulate water-insoluble fire-retardant, wherein said organic binder and said fire-retardant are free of any substances which substantially deactivate the adsorbent.

It is further desirable that the presence of the fire-retardant does not substantially reduce the air and water vapour permeability of the foam.

As pointed out in the aforesaid U.S. Pat. No. 4,046,939, flexible foams do not per se posssess high mechanical strength so that, for use in garments, it is the customary practice to bond, i.e. laminate, the foam on at least one side, in known manner, to a fabric, such as a knitted or woven textile material, for example, nylon tricot, cotton sheeting, canton flannel, poplin, percale, etc., in order to provide a reinforced material. Instead of loose knit or woven fabrics, non-woven fabrics such as netting or scrim may also be used to reinforce the foam. A preferred material is nylon tricot, warp-knitted from multi-filament yarn in natural undyed nylon. If the reinforcing fabric is also impregnated some additional resistance may be obtained in view of the additional adsorbent employed; however this effect is usually minimal. The fabric is essentially for mechanical reinforcement and is bonded to the foam by known lamination techniques such as flame lamination, adhesive lamination, stitch bonding and quilting. For example, Chemical Warfare protective garments may be made from a laminate of the foam with a layer of nylon tricot on both sides of the foam. The outer layer may be treated with a fluorocarbon water/oil repellant.

For some applications, a flame retardant backing material is preferred. One such material is sold under the trade mark Avtex which is 80% flame retardant rayon and 20% Nomex which itself is a trade mark for a heat-resistant nylon material, specifically the copolymer of metaphenylenediamine and isophthaloyl chloride. Other flame retardant backings contemplated include any inherently flame retardant materials such as Nomex, Nomex/Kevlar blends, flame retardant rayons polybenzimidazole fabrics, fibres from polymers with high halogen contents, etc. Fibres that have been made inherently flame retardant include aramids, modacrylics, Cordelan, novoloids, vinyon, asbestos and glass, as well as acetate, rayon, polyester and nylon.

In addition to substantially maintaining high permeability to water vapour and air, these laminates also substantially retain the flexibility of the foam material per se.

Whilst polyurethane foams such as those of the polyester or polyether type are the preferred foams, other foams may be impregnated with advantage, including cellulose, polystyrene and vinyl polymers. A flexible permeable polyester type foam sold by William T. Burnett of Baltimore, Md., under the trade name Type 582S is preferred. Foamed synthetic and natural rubbers are not particularly suitable as they may contain substances such as impurities, low molecular weight polymer, or processing additives in amounts large enough to saturate a significant part of the adsorption capacity of the adsorbent and therefore become less effective in adsorbing noxious chemicals although they can be treated according to the present invention with advantage. The thickness of the foam material can vary widely from about 1/16" or less up to several inches, depending upon the final use. Similarly density and cell size can vary over a wide range depending upon the porosity desired. For most applications a foam thickness of 3.0 to 3.4 mm, a density of 25 to 29 kg/m$^3$ and an air permeability of 25 to 200 cm$^3$/cm$^2$.s is preferred. It will be appreciated that in the laminates the laminate thickness (foam+backing) is less than the thickness of the foam before flame bonding. This is due to melting of foam during flame bonding.

The adsorbent material in particulate form may be any solid particulate material capable of adsorbing the noxious chemicals. Such adsorbent materials are well known per se in the art and include, for example, silica gel and active clays of the attapulgite and bentonite classes, e.g. Fuller's earth. A particularly preferred adsorbent material is activated carbon. It is critical that the organic binder and other additives to the foam material do not contain substances which substantially deactivate the adsorbent. It is also desirable that the presence of the adsorbent in the foam material does not substantially reduce the permeability of the foam per se to air and water vapour.

The activated carbon which is preferably used may be produced by heat treatment of vegetable matter, animal matter, coal, lignite, petroleum residues or synthetic organic polymers either with or without the addition of chemicals, and characterized by rapid and effective adsorption. A suitable material is charcoal Type BPL granular charcoal made from bituminous coal by Calgon Corporation. Preferably the carbon should be finely divided to ensure even impregnation and maximum adsorptive capability. The active carbon may have a particle size of about 1 to 20 microns. It has been found that with coarse powder (circa 25 microns) the suspension settles too rapidly and an excessive amount of binder is required to prevent rubbing off. Preferably, particles greater than 6 microns in diameter shall not constitute more than 50% of the mass of a sample and particles equal to, or greater than 5 microns shall not number more than 20% of a selected sample.

In order to provide clothing for adequate protection of the body against chemical warfare agents at least 5 milligrams of active carbon per square centimeter of foam are usually required. Up to about 12 to 15 milligrams of active carbon per square centimeter of foam can be present, without marked loss of porosity or flexibility to flexible foams. In less critical applications the presence of amounts less than 5 milligrams per square centimeter of foam may be quite satisfactory. The amount of active carbon present in the foam can be varied by adjusting the concentration of the carbon in the impregnating suspension or by repeating the impregnation of the foam or by mechanically squeezing the foam after it passes through the impregnation bath.

The fire-retardant is a solid particulate water-insoluble material and is incorporated into the charcoal dipping bath in the form of a fine powder or aqueous suspension of the fine powder. The particle size of the fire retardant is in the range of 1 to 20μ. It will be apparent from the Examples which follow that decabromodiphenyl oxide is an effective flame retardant in itself. However, some after-glow persists. This after-glow is overcome by including an after-glow suppressant. An ammonium phosphate polymer Phos-Chek ® may be employed. However, this material may reduce the activity of the charcoal. An ammoniated polymer of tetrakis (hydroxy methyl) phosphonium chloride $[(HOCH_2)_4PCl.NH_3]_n$ sold under the trade marks Caliban P72 or Amgard SW has been found to be most useful. The total amount of fire-retardant is 5–65 and preferably not more than 55 pphC, i.e. 10 to 45 pphC of decabromodiphenyl oxide and 5 to 20 pphC of after-glow suppressant.

The organic binder may be of any type known to the carbon impregnating art (pigment binding art; powder binding art) and which does not contain substantial amounts of substances such as impurities, low molecular weight polymer processing additives and plasticizers which are adsorbed by activated carbon in amount sufficient to effect a substantial reduction of the adsorptive capacity of the activated carbon. Examples of water soluble binders include natural gums, cellulose and starch derivatives, salts of alginic acid and polymers of acrylic acid, acrylamide, vinyl alcohol and vinyl pyrrolidone. Examples of organic binders which are soluble in organic solvents but not soluble in water include cellulose esters, cellulose ethers, polymers and co-polymers of vinyl esters such as vinyl acetate, styrene, acrylic esters, methacrylic esters, butadiene, acrylonitrile and chloroprene; natural rubber and chlorinated rubber. Examples of water insoluble binders used in the form of a dispersion in water often referred to as a latex include natural and synthetic rubbers, polymers, and co-polymers of vinyl esters, vinyl acetals, acrylic esters, methacrylic esters, styrene, butadiene, acrylonitrile chloroprene, ethylene and propylene. One such suitable material is a self-crosslinking acrylic latex with a glass transition temperature of −1° C., previously sold by Union Carbide under the trade mark Ucar 874 Latex and now known as Ucar 154 sold by Ashland Chemicals. A similar acrylic latex co-polymer sold under the trade mark Rhoplex TR 908 has also been found acceptable.

When water is used as the medium of the impregnation suspension it is usually desirable to add a dispersing agent to assist in dispersion of the activated carbon and prevent flocculation of dispersed activated carbon. When the binder is in the form of an aqueous dispersion of a water insoluble binder such as the latex form of natural rubber, polyethylacrylate or polyvinyl acetate it is desirable to add a stabilizing agent to the suspension of activated carbon in water before incorporating the binder, so as to prevent mutual flocculation of the activated carbon and the latex binder. It is believed that in the absence of such a stabilizing agent, the emulsifying and dispersing agents added during manufacture of a latex binder and which are essential for its stability are preferentially adsorbed by the activated carbon and the latex becomes so unstable as to flocculate. Substances have been found which function as dispersing agents as well as stabilizing agents, and examples of these include ammonium caseinate, the sodium salt of a co-polymer of styrene and maleic anhydride; the sodium salt of the condensation product of formaldehyde and naphthalene sulphonic acid; the sodium or ammonium salt of sulphonated lignin; the sodium salt of carboxymethyl cellulose; methylcellulose and polyvinyl pyrrolidone. SMA ®-1440H, a water-soluble low molecular weight styrene-maleic anhydride copolymer which is partially esterified and neutralized, made by Atochem Inc., has been found to be most useful.

Elastomeric binders such as natural rubber, synthetic rubbers and polyethylacrylate are preferred when flexibility is required, but when some rigidity is acceptable non-elastomeric binders such as polyvinyl acetate may be used. The amount of binder can vary quite widely between about 15 and 100 parts per 100 parts by weight of carbon; 25 parts per 100 parts of carbon being particularly satisfactory. Insufficient binder causes weak binding and hence excessive "rub-off". Excess binder may impede the access of the noxious gases to the carbon thus reducing adsorption efficiency in addition to unnecessarily increasing the weight of the foam and reducing drape and flexibility.

In addition to the activated carbon, dispersion agents, stabilizing agents and binder, the impregnating suspension may also include high molecular weight water-soluble polymers such as carboxymethyl cellulose which act as a protective colloid suspending agent to inhibit settling of the activated carbon. A suitable material is sold by Hercules, Canada Limited, under the trade designation CMC7L.

The total amount of dispersing/suspending agents included is 2 to 6 pphC and preferably no more than 4.5 pphC.

A liquid repellent agent such as the fluorochemical polymer dispersion known under the trade mark FC 208, a product of Minnesota Mining and Manufacturing Co. may be added to the suspension to impart water and oil repellency to the impregnated foam.

After impregnating the foam and drying, the impregnated foam may also be impregnated with a liquid repellent to impart thereto repellency to liquids. The foam may also be impregnated with an elemental carbon-free solution or dispersion of the binder to increase the resistance of the carbon dispersed in the foam to removal by mechanical action. The foam may also be impregnated with a suspension of pigment such as titanium dioxide or yellow iron oxide to cover or partly cover the black colour of the carbon, to effect camouflage colouring or reduce absorption of radiant heat.

In general, it is essential that the material such as the binder, dispersing agents, repellents, pigments added to the impregnating suspension together with the activated carbon, or applied in a second impregnation after the impregnation with active carbon, are free from substances which are absorbed by the activated carbon and have the effect of reducing the useful adsorptive capacity of the activated carbon. However, the addition of materials which have an adverse effect upon the useful adsorptive capacity of the carbon may be acceptable, provided that the amount of such material in relation to the amount of activated carbon is not large enough to lower the useful adsorptive capacity of the carbon below that required for the use to which the impregnated foam is to be put. Thus in some uses, a loss of more than five per cent of the adsorptive capacity of the carbon would not be acceptable, in other uses a loss of twenty per cent of the adsorptive capacity of the carbon would be acceptable, when the use of a particular binder or other additive would confer desirable properties such as high flexibility, liquid repellency or resistance to burning.

PROCEDURES

Bath Preparation

Padding of the foam laminates was carried out on three different scales designated laboratory, pilot plant and preproduction even though these terms are not strictly accurate. Depending on the scale of operation, padding baths were mixed with a small laboratory mixer, a Hobart dough mixer or a propeller mixer in a 200 L tank. In full scale production a ball mill is used to mix the slurry.

The dispersing agent SMA-1440H was added to the proper amount of water followed by the flame retardants and then the charcoal. There was some difficulty each time in wetting the fine, dry charcoal without some dusting. When the vessel could be covered, it was best to add the charcoal all at once, put the cover in place and operate the stirrer until the charcoal was completely wet.

When the charcoal was dispersed as well as possible suspensions for pilot and preproduction batches were passed twice through a Premier colloid mill. As soon as possible after colloid milling, carboxymethyl cellulose (CMC) was added as a 5% solution prepared according to the supplier's directions and finally the latex was added. Sometimes the CMC and latex were combined and added together to the charcoal mix. Only gentle mixing was required to blend the CMC and latex with the charcoal suspension. Some of the initial water or a known amount of additional water was used to rinse out various containers and the colloid mill.

Baths were usually prepared at a concentration of about 40% solids. Without the CMC and latex the solids settled very quickly to a hard sediment but with the CMC and latex most baths were stable for several weeks. Any sediment was very soft and could be redispersed by stirring with a spatula or paddle.

Burning Test

The materials were tested to determine their resistance to burning using a modification of Canadian Government Specifications Board Standard CAN/CGSB-4.2 Method 27.1 in which the material under test was held vertically by its edges in a frame.

Impregnation is followed by squeezing or pressing to remove excess liquid, drying and airing the binder incorporated with the active carbon in the suspension. Curing is effectively achieved at about 140° C. for at least three minutes or at about 120° C. for at least ten minutes. When rigid foams are impregnated vacuum techniques to remove excess liquid may be employed.

EXPERIMENTAL RESULTS

LABORATORY AND PILOT SCALE

Some of the results obtained with the Monsanto product Phos-Chek P/30 (PCP30) as a single flame retardant are given in Table 1. The amounts of flame retardant and of latex binder used are expressed as parts of solids per hundred parts of charcoal (pphC). After-flame is given first as the number of specimens out of the six tested which showed after-flame and then the average time for only these specimens. In some of the later tables in which average results are given for more than one run the number of after-flame specimens has been converted to a basis of six.

TABLE 1

| | | | Results Obtained with Phos-Chek P/30 (PCP30) as Flame Retardant | | | | |
|---|---|---|---|---|---|---|---|
| PCP 30 pphC | Latex pphc | Charcoal Load g/m² | Specific Activity | Launder Loss % | Char Length cm | After Flame | | After Glow |
| | | | | | | n/6 | s | s |
| 0 | 20 | 79 | 0.67 | 8 | | | | |
| 15 | 20 | 74 | 0.65 | 17 | 22 | 4 | 21 | 0 |
| 15 | 15 | 86 | 0.61 | 17 | 20 | 2 | 21 | 0 |
| 20 | 20 | 78 | 0.56 | 16 | 25 | 4 | 34 | 0 |
| 20 | 15 | 88 | 0.55 | 21 | 18 | 2 | 23 | 0 |
| 40 | 20 | 82 | | 27 | 18 | 3 | | 0 |

Results of Table 1 indicate that differences between the several retardant formulas were not large. Overall, Phos-Chek P/30 prevented after-glow but not after-flame. It reduced specific activity of the carbon slightly and increased the Launder-Ometer loss. Part of this increased Launder-Ometer loss can be explained by the fact that as the amount of flame retardant is increased for the same amount of latex relative to the charcoal the amount of binder per unit of powdered solids to be bonded is actually decreased.

TABLE 2

| DBDPO as a Flame Retardant (DBDPO = 35, Latex Binder = 20 pphC) | | | | | | |
|---|---|---|---|---|---|---|
| Solids Add-on % | Charcoal Load g/m² | Specific Activity | Launder Loss % | Char Length cm | After Flame s | After Glow s |
| 54 | 39 | 0.70 | 28 | 18 | 16 | 54 |
| 79 | 57 | 0.62 | 18 | 13 | 0 | 15 |
| 104 | 71 | 0.63 | 17 | 18 | 4 | 20 |
| 137 | 97 | 0.71 | 12 | 9 | 0 | 16 |

The effects with 5 pphC of Phos-Chek added to 35 pphC of DBDPO are shown in Table 3. The Phos-Check prevented after-glow without introducing after-flame at the desired level of add-on but specific activity of charcoal was reduced as it was for the results in Table 1.

TABLE 3

| DBDPO Combined with Phos-Check P/30 (DBDPO = 35, PCP30 = 5, Latex = 20 pphC) | | | | | | |
|---|---|---|---|---|---|---|
| Solids Add-on % | Charcoal Load g/m² | Specific Activity | Launder Loss % | Char Length cm | After Flame s | After Glow s |
| 54 | 39 | 0.62 | 10 | 20 | 23 | 0 |
| 68 | 49 | 0.59 | 8 | 13 | 4 | 0 |
| 76 | 56 | 0.58 | 7 | 11 | 0 | 0 |
| 121 | 88 | 0.54 | 6 | 9 | 0 | 0 |

With 10 pphC of Caliban P72 instead of Phos-Chek p/30 the results were as in Table 4. In comparing Table 4 with Tables 2 and 3 it should be noted that the level of solids add-on is somewhat higher in Table 4. Thus at acceptable levels of add-on both Phos-Check and Caliban P72 prevented after-glow with no effect on char length or after-flame. Phos-Check gave a lower Launder-Ometer loss and a lower specific activity than Caliban P72.

TABLE 4

DBDPO Combined with Caliban P72
(DBDPO = 35, P72 = 10, Latex = 20 pphC)

| Solids Add-on % | Charcoal Load g/m² | Specific Activity | Launder Loss % | Char Length cm | After Flame s | After Glow s |
|---|---|---|---|---|---|---|
| 82 | 58 | 0.66 | 16 | 12 | 0 | 0 |
| 109 | 75 | 0.64 | 16 | 9 | 0 | 0 |
| 136 | 96 | 0.66 | 14 | 9 | 0 | 0 |
| 164 | 115 | 0.63 | 11 | 9 | 0 | 0 |

Results for various combinations of DBDPO, Phos-Check P/30 and Caliban P72 all with a latex level of 20 pphC are given in Table 5. Except that either Phos-Check or Caliban P72 was necessary to prevent after-glow there were no definite trends in the results.

Table 6 gives the results of a laboratory factorial experiment to show the effects of 5 pphC of Phos-Check P/30, 10 pphC of Caliban P72 at two levels of latex binder all with 35 parts of DBDPO. After-flame was zero or very short so is not tabulated. The bottom portion of the table gives pairs of averages to show the effects of the two levels of each of the additives. Each line is the average of four results. As before, both Phos-Chek P/30 and Caliban P72 prevented after-glow with little effect on char length. In this experiment both these additives reduced Launder-Ometer loss. The effect of increase latex binder was to reduce Launder-Ometer loss and to reduce flame resistance. Specific activity was not appreciably reduced.

TABLE 5

Results for Various Combinations of Flame Retardants
(Latex Level = 20 pphC)

| Flame Retardants (pphC) | | | Charcoal Load g/m² | Specific Activity | Launder Loss % | Char Length cm | After Flame | | After Glow s |
|---|---|---|---|---|---|---|---|---|---|
| DBDPO | P72 | PCP30 | | | | | n/6 | s | |
| 0 | 5 | 15 | 72 | 0.63 | 27 | 12 | 0 | 0 | 0 |
| 0 | 10 | 10 | 78 | 0.57 | 22 | 15 | 0 | 0 | 0 |
| 10 | | 20 | 66 | 0.62 | 13 | 14 | 3 | 4 | 0 |
| 10 | | 20 | 74 | 0.50 | 11 | 12 | 0 | 0 | 0 |
| 15 | 10 | 5 | 77 | 0.60 | 13 | 14 | 4 | 4 | 0 |
| 20 | 10 | | 79 | 0.65 | 20 | 12 | 2 | 2 | 0 |
| 20 | | 10 | 62 | 0.62 | 9 | 11 | 1 | 6 | 0 |
| 20 | 5 | 5 | 76 | 0.58 | 18 | 13 | 0 | 0 | 0 |
| 25 | 5 | | 81 | 0.68 | 24 | 15 | 1 | 28 | 0 |
| 25 | 10 | | 70 | 0.72 | 29 | 11 | 1 | 5 | 0 |
| 30 | 5 | | 69 | 0.55 | 18 | 12 | 0 | 0 | 0 |
| 45 | | | 66 | 0.63 | 33 | 13 | 0 | 0 | 19 |

TABLE 6

Effect of Phosphorus Flame Retardants in Combination with DBDPO
(DBDPO = 35 pphC)

| Additives (pphC) | | | Specific Activity | Launder Loss % | Char Length cm | After Glow s |
|---|---|---|---|---|---|---|
| P72 | PCP30 | Latex | | | | |
| | | 20 | 0.64 | 23 | 12 | 11 |
| 10 | | 20 | 0.66 | 20 | 10 | 0 |
| | 5 | 20 | 0.58 | 13 | 11 | 0 |
| 10 | 5 | 20 | 0.67 | 16 | 11 | 0 |
| | | 30 | 0.64 | 27 | 17 | 26 |
| 10 | | 30 | 0.63 | 9 | 12 | 0 |
| | 5 | 30 | 0.63 | 7 | 16 | 0 |
| 10 | 5 | 30 | 0.59 | 5 | 15 | 0 |
| 0 | | | 0.62 | 18 | 14 | 9 |
| 10 | | | 0.64 | 12 | 12 | 0 |
| | 0 | | 0.64 | 20 | 13 | 9 |
| | 5 | | 0.62 | 10 | 13 | 0 |
| | | 20 | 0.64 | 18 | 11 | 3 |
| | | 30 | 0.62 | 12 | 15 | 6 |

In a similar factorial experiment Rhoplex TR908 was compared with Ucar 874 at two levels with and without flame retardant. The flame retardant formula was 30 parts DBDPO and 5 parts Caliban P72. The results are in Table 7 in which the lower portion again gives pairs of averages for the variables. There were no differences between the two latexes. The higher level of latex reduced Launder-Ometer loss with slight reductions in specific activity and flame resistance. There was no after-glow with any of the flame retardant treated samples. There appears to be one anomalous result in Table 7; the Launder-Ometer loss of 22% for 30 parts Ucar 874 without flame retardant (second row) is much higher than expected.

TABLE 7

Comparison of Two Latexes at Two Levels with and without Flame Retardants.

| Flame Retardants (pphC) | | Latex Binder | | Specific Activity | Launder Loss % | Char Length cm | After Flame | |
|---|---|---|---|---|---|---|---|---|
| DBDPO | P72 | Latex | pphC | | | | n/6 | s |
| 0 | 0 | Ucar | 20 | 0.69 | 28 | | | |
| 0 | 0 | | 30 | 0.69 | 22 | | | |
| 0 | 0 | Rhoplex | 20 | 0.73 | 44 | | | |
| 0 | 0 | | 30 | 0.74 | 13 | | | |
| 30 | 5 | Ucar | 20 | 0.70 | 33 | 16 | 4 | 17 |
| 30 | 5 | | 30 | 0.58 | 9 | 20 | 6 | 18 |
| 30 | 5 | Rhoplex | 20 | 0.67 | 18 | 19 | 4 | 22 |
| 30 | 5 | | 30 | 0.67 | 10 | 22 | 4 | 21 |
| 0 | 0 | | | 0.71 | 27 | — | — | — |
| 30 | 5 | | | 0.66 | 18 | 19 | 5 | 20 |
| | | Ucar | | 0.66 | 23 | 18 | 5 | 18 |
| | | Rhoplex | | 0.71 | 21 | 20 | 4 | 22 |

TABLE 7-continued

| | | | | Launder | Char | After | |
|---|---|---|---|---|---|---|---|
| Flame Retardants (pphC) | | Latex Binder | Specific | Loss | Length | Flame | |
| DBDPO | P72 | Latex | pphC | Activity | % | cm | n/6 | s |
| | | | 20 | 0.70 | 31 | 18 | 4 | 20 |
| | | | 30 | 0.67 | 14 | 21 | 5 | 20 |

Table 7 title (continued): Comparison of Two Latexes at Two Levels with and without Flame Retardants.

One of the purposes of the preproduction trails was to prepare barrier material with air and water-permeable fabric, e.g. nylon tricot, laminated to both sides of the polyurethane foam. Regular weight tricot on both sides gave a product that was unnecessarily heavy so a lighter nylon tricot was procured. On the basis of these trials, a Type II product with light nylon tricot on both sides of the polyurethane foam was made. The Type I is a one-sided product. Because foam with light nylon on one side could now be readily obtained one run was made with this combination.

Detailed results for four preproduction runs for the fire retardant formulations of Table 8 are given in Table 9. The two runs UFT 220 and 224 with regular weight nylon tricot on one side are given first. Run UFT 223 was with light tricot on both sides (Type II) and UFT 222 with light tricot on one side.

The unimpregnated Type II was somewhat heavier than the unimpregnated Type I laminate because the lighter tricot was of a basis weight (weight per unit area) of about 40 g/m² and the regular was about 60 g/m². With lighter tricot on one side only the laminate was somewhat lighter than the regular Type I laminate but there was no difficulty in adding on the same amount of charcoal. However the resulting air permeability was lower than for the other materials. With light tricot on one side the tensile strength and tear resistance were lower than for the others. With light tricot on both sides tensile strength and tear resistance were not appreciably different from the regular Type I product.

TABLE 8

| | Proportions in parts per 100 parts of Charcoal | | |
|---|---|---|---|
| Trial | 1 | 2 | 3 |
| Runs | UFT 220,221 | UFT 222,223 | UFT 224 |
| Charcoal | 100 | 100 | 100 |
| SMA-1440H (solids) | 3 | 3 | 3 |
| Total DBDPO | 35 | 40 | 35 |
| Antimony Oxide | 0 | 2.5 | 5 |
| Caliban P72 | 5 | 5 | 5 |
| Carboxymethyl cellulose | 1 | 1 | 1.5 |
| Latex (solids) | 25 | 25 | 25 |
| Total Solids | 169 | 176.5 | 174.5 |
| Solids Concentration | 40.0 | 40.8 | 40.0 |

TABLE 9

| Run Number | UFT 220 | UFT 224 | UFT 223 | UFT 222 |
|---|---|---|---|---|
| Nylon Weight | regular | regular | light | light |
| Sides | one | one | two | one |
| Laminate Mass (g/m²) | 130 | 131 | 154 | 113 |
| Thickness (mm) | 2.34 | — | 2.30 | 2.26 |
| Antimony Oxide (pphC) | 0 | 5 | 2.5 | 2.5 |
| Solids Add-on (%) | 119 | 115 | 89 | 121 |
| Impregnated Mass (g/m²) | 259 | 264 | 270 | 237 |
| Thickness (mm) | 2.15 | 2.25 | 2.12 | 2.36 |
| Solids (g/m²) | 141 | 141 | 127 | 129 |
| Charcoal (g/m²) | 84 | 81 | 72 | 73 |
| Permeability (cm³/cm² · s) | 84 | 85 | 74 | 42 |
| Wash out (% solids) | 1.9 | 0.8 | 0.7 | 0.9 |
| Launder-Ometer (% solids) | 11.0 | 8.4 | 6.4 | 7.1 |
| Volume Activity (g/m²) | 49.6 | 48.6 | 43.0 | 43.0 |
| Specific Activity (g/m²) | 0.59 | 0.60 | 0.60 | 0.59 |
| Char Length (cm) | 17 | 14 | 22 | 18 |
| After-flame (n/6,s) | 0.3,32 | 0,0 | 1.5,23 | 0,0 |
| After-glow (n/6,s) | 0,0 | 5,20 | 6,16 | 6,12 |
| Tensile strength MD (N/25 mm) | 146 | 132 | 143 | 75 |
| CD | 95 | 103 | 143 | 78 |
| Elongation MD (%) | 42 | 41 | 29 | 27 |
| CD | 67 | 70 | 88 | 81 |
| Tear MD (N) | 15.7 | 14.6 | 14.2 | 9.2 |
| CD | 15.3 | 14.4 | 14.6 | 9.0 |

In Table 10 below, the results of various lab and pilot trials with a flame retardant backing are described. The results show a substantial reduction in char length with the "Avtex" backing. Runs 446 and 447 were pilot trials, the others were lab trails. Also improved was the launder-ometer loss. This is most likely due to better adhesion of the binder to the rayon-Nomex compared to the nylon backing. The charcoal loading is higher for a given % add-on for the Avtex backed foam because the greige weight of the Avtex foam was 169 g/m² compared to about 130 g/m² for the nylon/foam material. The Avtex itself was about 105 g/m².

TABLE 10

| Run Number | 446 | 447 | F23AB | F234D | F234A | F234D |
|---|---|---|---|---|---|---|
| Backing | "Avtex" | Regular | Avtex | Regular | Avtex | Regular |
| DBDPO | 35 | 35 | 35 | 35 | 35 | 35 |
| P72 | 5 | 5 | 5 | 5 | 0 | 0 |
| % Add-On | 152 | 132 | 83.6 | 67.1 | 75.0 | 64.5 |
| Charcoal (g/m²) | 150 | 96.1 | 92.9 | 50.5 | 94.0 | 52.7 |
| Launder-Ometer Loss (%) | 3.5 | 9.0 | 9.2 | 17.9 | 7.5 | 14.3 |
| Char Length (cm) | 8 | 15 | 10 | 17 | 11 | 22 |
| After Flame(s) | 0 | 10(1/6) | 0 | 16(4/6) | 0 | 16(4/5) |
| After Glow(s) | 0 | 0 | 0 | 0 | 0 | 44(5/5) |

Note: All loading based on 100 parts charcoal. "Regular" backing is nylon tricot.

In Table 10 (Run F234D) you can also see that by removing the P72 from the formula, we had no after glow in the sample with the Avtex backing while the nylon backing has substantial after glow.

CURING

In one experiment using the UFT 220 formula (Trial 1 Table 8) enough laminate was dried at a low temperature in the laminator to provide sufficient material for curing at various times and temperatures. The material was dried with air entering at 87° C. and leaving at 60° C. Results of this experiment which are given in Table 11 shows that there was no curing at 80° C. for 20 minutes nor at 100° C. for 15 minutes. Approximately the same cure was obtained at 120° C. for 10 minutes as at 140° C. for 3 minutes. A longer cure at 140° C. reduced Launder-Ometer loss still further but possibly also reduced specific activity. The total time for drying and curing of about eleven minutes was employed and should not be exceeded.

TABLE 11

Effect of Curing on Launder-Ometer Resistance and Charcoal Activity (DBDPO = 35, Caliban P72 = 5)

| Curing Temp °C. | Curing Time min. | Launder Loss % | Standard Wash-out % of Solids | Specific Activity |
|---|---|---|---|---|
| Dry Control | | 58 | 3.1 | 0.69 |
| 80 | 8 | 49 | 1.3 | 0.66 |
| | 20 | 53 | 2.3 | 0.70 |
| 100 | 6 | 53 | 2.4 | 0.70 |
| | 15 | 49 | 1.9 | 0.64 |
| 120 | 4 | 41 | 2.1 | 0.70 |
| | 10 | 26 | 1.5 | 0.72 |
| 140 | 3 | 24 | 1.2 | 0.74 |
| | 8 | 6 | 0.4 | 0.66 |

A particularly preferred foam material consists of:
a flexible open-cell polyester-type polyurethane foam; and impregnated in said foam, an aqueous dispersion of

| | |
|---|---|
| finely divided activated carbon | 100 |
| finely divided decabromodiphenyl oxide | 48 |
| an acrylic latex binder | 25 |
| an ammoniated polymer of tetrakis (hydroxymethyl) phosphonium chloride | 6.9 |
| water-soluble partially esterified and neutralized styrene-maleic anhydride copolymer | 3 |
| carboxymethyl cellulose | 1 | wherein the proportions of ingredients are expressed in parts per 100 parts of activated carbon.

It is desirable that the basic foam material (before impregnation) be resistant to burning so that the flame retardant treatment is required only to control burning of the carbon impregnant. Again, any flame retardant chemicals used to achieve this must not migrate into the activated carbon. Fabric bonded to the foam may be made from inherently flame resistant fibre material as discussed above. Similarly, polyurethane foam may be made by reaction of an isocyanate with a polyol in which phosphorus, nitrogen or a halogen is part of the polyol molecule. Organic flame retardants which are not chemically reacted to form part of the chemical structure of the polyurethane can migrate into the activated carbon and are therefore unsuitable.

In view of the various embodiments described hereinabove, it should be apparent to those skilled in the art that the present invention may be embodied in forms other than those specifically described herein without departing from the spirit or central characteristics of the invention. Thus, the specific embodiments described above are to be considered in all respects as illustrative and not restrictive.

We claim:

1. A fire-retardant air and water vapour permeable foam material resistant to passage therethrough of noxious chemicals in liquid or vapour form, consisting of a flexible open-cell polyester-type polyurethane foam; and impregnated in said foam, an aqueous dispersion of

| | |
|---|---|
| finely divided activated carbon | 100 |
| finely divided decabromodiphenyl oxide | 48 |
| an acrylic latex binder | 25 |
| an ammoniated polymer of tetrakis (hydroxymethyl) phosphonium chloride | 6.9 |
| water-soluble partially esterified and neutralized styrene-maleic anhydride polymer | 3 |
| carboxymethyl cellulose | 1 | wherein the proportions of ingredients are expressed in parts per 100 parts of activated carbon.

2. A fire-retardant air and water permeable foam material resistant to passage therethrough of noxious chemicals in liquid or vapor form consisting of:
a flexible open-cell foam and, impregnated in said foam, an aqueous dispersion of:

| | |
|---|---|
| finely divided activated carbon | 100 |
| decabromodiphenyl oxide as a solid fire-retardant | 10 to 45 |
| an after-glow suppressant | 5 to 20 |
| a water-insoluble organic binder for bonding said particles in said foam | 15 to 30 | wherein the proportions of ingredients are expressed in parts per 100 parts of activated carbon.

3. The fire-retardant material according to claim 1 wherein the binder is a water-insoluble latex.

4. The fire retardant according to claim 2 wherein the aqueous dispersion additionally includes a dispersing agent.

5. The fire-retardant material according to claim 2, wherein the aqueous dispersion includes a thickener.

6. The fire-retardant material according to claim 2, wherein the foam material is a flexible polyurethane foam.

7. The fire-retardant material according to claim 2, wherein the activated carbon loading is 5 to 15 mg/cm$^2$.

8. The fire-retardant material according to claim 3, wherein the latex is an acrylic latex.

9. The fire-retardant material according to claim 2, wherein the after-glow suppressant is an ammoniated polymer of tetrakis (hydroxymethyl) phosphonium chloride.

10. The fire-retardant material according to claim 4 wherein the dispersing agent is a water-soluble styrene-maleic anhydride polymer.

11. The fire-retardant material according to claim 5, wherein the thickener is carboxymethyl cellulose.

12. The fire-retardant material according to claim 2, wherein the particle size of the activated carbon is 1 to 2μ.

13. A fire-retardant air and water permeable foam material resistant to passage therethrough of noxious chemicals in liquid or vapor form consisting of:
a flexible open-cell polyurethane foam and, impregnated in said foam, an aqueous dispersion of:

| | |
|---|---|
| finely divided activated carbon | 100 |
| decabromodiphenyl oxide as a solid fire-retardant | 10 to 45 |
| an ammoniated polymer of tetrakis (hydroxymethyl) phosphonium chloride as an after-glow suppressant | 5 to 20 |
| a water-insoluble organic binder for bonding said particles in said foam | 15 to 30 | wherein the proportions of ingredients are expressed in parts per 100 parts of activated carbon.

14. A fire-retardant material according to claim 2, bonded to an air and water vapour permeable fabric.

15. A fire-retardant material according to claim 2, bonded on both sides to an air and water vapour permeable fabric.

16. A fire-retardant material according to claim 14, wherein the fabric is of nylon tricot.

17. A fire-retardant material according to claim 15, wherein the fabric is of nylon tricot.

18. A fire-retardant material according to claim 14, wherein the fabric is a fire-retardant fabric.

19. A fire-retardant material according to claim 14 in the form of a garment.

* * * * *